(12) United States Patent
Bean

(10) Patent No.: US 7,618,085 B1
(45) Date of Patent: Nov. 17, 2009

(54) FIFTH WHEEL TRAILER HOUSING BOAT AND LIVING QUARTERS

(76) Inventor: Gary Bean, 89 E. Larry Cir., Ringgold, GA (US) 30736

( * ) Notice: Subject to any disclaimer, the term of this patent is extended or adjusted under 35 U.S.C. 154(b) by 14 days.

(21) Appl. No.: 11/622,963

(22) Filed: Jan. 12, 2007

(51) Int. Cl.
*B60P 3/00* (2006.01)
(52) U.S. Cl. .................................. 296/157; 296/24.4
(58) Field of Classification Search .................. 296/156, 296/157, 158, 168, 61, 24.4, 37.1, 37.6; 414/537, 414/462
See application file for complete search history.

(56) References Cited

U.S. PATENT DOCUMENTS

| | | | |
|---|---|---|---|
| 3,348,858 A | 10/1967 | Rose | |
| 3,556,582 A | 1/1971 | Bledsoe | |
| 3,563,596 A | 2/1971 | Davis | |
| 3,649,064 A | 3/1972 | Bledsoe | |
| 3,704,794 A * | 12/1972 | Flamm | 414/537 |
| 3,784,248 A * | 1/1974 | Neuman | 296/157 |
| 3,917,086 A | 11/1975 | Sexton | |
| 4,397,496 A | 8/1983 | Drygas, III | |
| 4,406,477 A | 9/1983 | McDonald | |
| 4,589,814 A | 5/1986 | Cates | |
| 4,705,289 A * | 11/1987 | Weber | 280/414.1 |
| 4,880,250 A * | 11/1989 | Cravens et al. | 280/414.1 |
| 4,923,243 A * | 5/1990 | Drahos | 296/157 |
| 4,932,830 A | 6/1990 | Woodburn | |
| 5,069,471 A | 12/1991 | Van Der Linden et al. | |
| 5,505,514 A | 4/1996 | Green | |
| 5,536,132 A | 7/1996 | Knott | |
| 5,649,803 A * | 7/1997 | Bennett | 414/537 |
| 5,730,578 A | 3/1998 | Smidler | |
| 5,899,656 A * | 5/1999 | Rahe et al. | 414/537 |
| 6,135,532 A | 10/2000 | Martin | |
| 6,497,442 B1 * | 12/2002 | Wacker | 296/24.32 |
| 6,598,253 B1 * | 7/2003 | Allen et al. | 14/71.1 |
| 6,651,392 B2 | 11/2003 | Ritzal | |
| 7,004,525 B1 | 2/2006 | Turnbow | |

FOREIGN PATENT DOCUMENTS

| | | |
|---|---|---|
| AU | 70792/74 | 8/1976 |
| EP | 0426907 | 5/1991 |
| GB | 911.690 | 11/1962 |
| GB | 2.053.152 | 2/1981 |

* cited by examiner

*Primary Examiner*—Dennis H Pedder
*Assistant Examiner*—Melissa A Black
(74) *Attorney, Agent, or Firm*—Michael I. Kroll

(57) ABSTRACT

An enclosed trailer having a pair of compartments with a common wall. One compartment serves as storage area and work space for a boat and trailer with a rear door that drops down providing a ramp for loading and unloading the boat and trailer. The other compartment comprises living quarters that is fully equipped with sleeping area and storage that can include stove, sink, and toilet, including other personal needs. A tow vehicle transports the trailer and can be unhooked from the trailer for boat towing or cruising.

7 Claims, 8 Drawing Sheets

FIFTH WHEEL TRAILER HOUSING BOAT AND LIVING QUARTERS

BACKGROUND OF THE INVENTION

1. Field of the Invention

The present invention relates generally to trailers and, more specifically, to an enclosed trailer having a pair of compartments with a common wall. One compartment serves as storage area and work space for a boat and trailer with a rear door that drops down providing a ramp for loading and unloading the boat and trailer. The other compartment comprises living quarters that is fully equipped with sleeping area and storage and can include stove, sink and toilet, including other personal needs. A tow vehicle transports the trailer and can be unhooked from the trailer for boat towing or cruising.

2. Description of the Prior Art

There are other trailers designed for hauling. Typical of these is U.S. Pat. No. 3,348,858 issued to Rose on Oct. 24, 1967.

Another patent was issued to Bledsoe on Jan. 19, 1971 as U.S. Pat. No. 3,556,582. Yet another U.S. Pat. No. 3,563,596 was issued to Davis on Feb. 16, 1971 and still yet another was issued on Mar. 14, 1972 to Bledsoe as U.S. Pat. No. 3,649,064.

Another patent was issued to Sexton on Nov. 4, 1975 as U.S. Pat. No. 3,917,086. Yet another U.S. Pat. No. 5,069,471 was issued to Van der Linden, et al. on Dec. 3, 1991. Another was issued to Green on Apr. 9, 1996 as U.S. Pat. No. 5,505,514 and still yet another was issued on Oct. 24, 2000 to Martin as U.S. Pat. No. 6,135,532.

Another patent was issued to Ritzal on Nov. 25, 2003 as U.S. Pat. No. 6,651,392. Yet another U.S. Pat. No. 7,004,525 was issued to Turnbow on Feb. 28, 2006. Another was issued to Pollock on Aug. 1, 1976 as Australian Patent No. AU 70792/74 and still yet another was published on May 15, 1991 to Belcastro as European Patent Application No. EP 0426907.

U.S. Pat. No. 3,348,858

Inventor: Floyd R. Rose

Issued: Oct. 24, 1967

An outdoor sporting assembly, which comprises a boat having a hull, a rib on each side of said hull and extending lengthwise of same, a spray rail for each side of said hull and being longitudinally movable thereon, a rear wheel assembly on each side of said hull, means hingedly mounting said rear wheel assemblies on the upper portion of said hull, said rear wheel assemblies having a support means with said means hingedly mounting said rear wheel assemblies on said hull being at the upper end of said support means, a rib on said support means, each of said rear wheel assemblies having at least one wheel on the lower end of said support means, said spray rail on each side of said hull engaging said rib on said support means for releasably holding said support means of said wheel assembly in fixed hull supporting position.

U.S. Pat. No. 3,556,582

Inventor: Sherman H. Bledsoe

Issued: Jan. 19, 1971

The invention is a house and boat trailer apparatus comprising: a house trailer portion including a frame supported at its rear extremity by a pair of wheels and having a main tongue at its front extremity; a closure mounted on said trailer portion and including a collapsible rear portion which may be collapsed to form a boat-receiving space to be occupied by the rear extremity of a boat; a rearwardly facing trailer portion including a frame for carrying said boat and supported at its rear end by a pair of wheels, the rear end of said boat and trailer being receivable sufficiently far into said boat receiving space to space said pairs of wheels relatively close together in tandem relationship, said boat trailer portion further including an auxiliary tongue at its front extremity; and coupling means for coupling said trailer portions together whereby said rear portion of said closure may be collapsed and the rear extremity of said boat and trailer received thereinto, said boat portions coupled together and towed by said main tongue and, when the destination is reached, said portions uncoupled and separated and said house trailer portion parked thus freeing said boat trailer portion for towing said boat.

U.S. Pat. No. 3,563,596

Inventor: George Gordon Davis

Issued: Feb. 16, 1971

A camper-hauler vehicle combining, on one trailer chassis, a body shell containing living facilities and a platform for carrying an auxiliary load like a boat or sport vehicle. The body shell is formed with a ledge portion overlying the platform and containing a sleeping area. Structure on each side of the platform defines wheel fenders and platform side rails.

U.S. Pat. No. 3,649,064

Inventor: Sherman H. Bledsoe

Issued: Mar. 14, 1972

A combination house and auxiliary trailer including a house trailer for mounting an enclosure and supported on a pair of wheels and including a forwardly projecting tongue for connection with a towing vehicle. An auxiliary trailer includes a pair of raisable support wheels and elevating means for raising them from a ground engaging position to a ground clearing position and, further, includes a rearwardly projecting tongue for connection with a towing vehicle. Support means is provided for engaging the front extremity of the auxiliary trailer with the rear extremity of the house trailer to support such auxiliary trailer cantileverally therefrom whereby the two trailers may be coupled together and the raisable wheels of the auxiliary trailer raised to their ground clearing position and the trailers towed as a unit. Alternatively, the raisable wheels may be lowered to their ground engaging position and the trailers uncoupled to be towed independently of one another. The enclosure may include an extendable portion which may be selectively extended when the trailers are separated to occupy the space occupied by the auxiliary trailer when the trailers are coupled together to thereby provide an enlarged enclosure for use as living quarters.

U.S. Pat. No. 3,917,086

Inventor: Robert L. Sexton

Issued: Nov. 4, 1975

Improvements in dual purpose trailer constructions alternately usable for boat carrying and camping purposes; a dual purpose combined camping and boat carrying trailer having built-in but retractable living and camping equipment (beds and a table) and removable boat mounting and handling roller assemblies mountable on the trailer floor; a dual purpose camping and boat carrying trailer designed for alternate boat handling and carrying use and camping and living use with access means provided for loading and discharging the boat, reaching the boat winch during boat loading and discharge, and entering and leaving the trailer body when the former access ways are secured, when using the trailer in the camping function; dual purpose camping and boat carrying trailer dimensioned and configured so that all the basic, necessary equipment for boat handling, securing and carrying and onsite camping are incorporated in a single vehicle.

U.S. Pat. No. 5,069,471

Inventor: James Van der Linden, et al.

Issued: Dec. 3, 1991

A travel and utility trailer combination includes a house trailer with a wheel mounted main frame supporting a main closure or house. The main frame has two spaced-apart side beams rearwardly thereof. An auxiliary trailer is hitched to the main frame to have position between the side beams. Side beam extensions are pivoted to the ends of the side beams to have end portions underlying the axle of the auxiliary trailer. A hydraulic linear motor is provided to raise the side beam extensions to horizontal positions to lift the auxiliary trailer wheels off of the ground for over-the-road travel. Removable positioning pins passing through openings in the side beam extensions and plates integral with the side beams maintain these extensions in horizontal position.

U.S. Pat. No. 5,505,514

Inventor: George M. Green

Issued: Apr. 9, 1996

A camper/trailer combination including an anterior camper having bedspace, kitchenspace and livingspace, mounted on a wheeled frame which includes a posterior boat or utility trailer. The combination is suitably adapted for towing by a pickup truck, automobile or other vehicle which has a conventional bumper or "gooseneck" trailer hitch mechanism. In one embodiment the utility trailer is adapted for carrying a boat and in another embodiment the utility trailer is modified to define a utility trailer for all terrain vehicles, bicycles, motorcycles and the like.

U.S. Pat. No. 6,135,532

Inventor: Larry Martin

Issued: Oct. 24, 2000

In accordance with one embodiment of the present invention, a recreational vehicle is provided including a loading ramp assembly. The loading ramp assembly comprises first and second loading ramp panels, first, second, third, and fourth pairs of cable supports, a cable drive assembly, a load cable, and a cable linkage assembly. The first loading ramp panel is secured proximate the bottom portion of the access opening so as to pivot relative thereto. The second loading ramp panel is secured proximate the second transverse edge of the first panel so as to permit the second panel to pivot relative to the first panel. The cable drive assembly includes a drive cable and a cable translation mechanism. The load cable is secured between the respective ones of a pair of cable supports secured to the second panel. The cable linkage assembly is arranged to couple movement of the drive cable with movement of the load cable, wherein the linkage assembly and the cable supports are arranged to distribute a uniform load over the load cable. The loading ramp assembly may be arranged to permit the first and second loading ramp panels to pivot in opposite directions between an extended position and a retracted position where the retracted position is characterized by substantially vertical alignment of the first and second panels and the extended position is characterized by a decreasing degree of inclination from the first panel to the second panel.

U.S. Pat. No. 6,651,392

Inventor: Harald Ritzal

Issued: Nov. 25, 2003

A portable motor-vehicle workshop has a plurality of rigid rectangular I-beam reinforced floor panels, bolts securing the floor panels together to form a planar horizontal floor, and a plurality of portals each having a pair of spaced vertical lower posts having lower ends secured to the floor, respective angled connector beams extending inward and upward at acute angles from upper ends of the lower posts, respective upper posts extending vertically from upper ends of the angled beams, and a horizontal connector beam extending between upper ends of the respective upper posts. A plurality of panels are bolted to the posts and beams of the portals and enclose a space above the floor. A lift on the floor can raise a vehicle up between the upper posts.

U.S. Pat. No. 7,004,525

Inventor: Carl D. Turnbow

Issued: Feb. 28, 2006

A combination livestock and travel trailer includes a trailer frame having wheels, a base floor and an upper ceiling, living quarters in the front portion of the trailer having a living floor above the base floor and a ceiling in common with the upper ceiling, a livestock portion in the rear portion of the trailer having a floor in common with the base floor and a horse ceiling below the upper ceiling, a first cargo area defined by the space between the horse ceiling and the upper ceiling and a second cargo area defined by the space between the horse ceiling and the upper ceiling. Additional components of the trailer may include a removable cover for the second cargo area, a gravity-fed water system with a fresh water tank in the second cargo area, a solar hot water heater, and fresh, gray, and black water tanks in the first cargo area down the center of the first cargo area with storage compartments along the outside of the trailer.

Australian Patent Number AU70792/74

Inventor: John Edward Pollock

Issued: Aug. 1, 1976

The invention comprises a wheeled chassis; a tow bar assembly fixed to one end of the chassis; a shell constituting a first unit releasably connected to and supported upon the chassis, said shell having an opening in one end thereof whereby it receives and is supported upon the chassis; a second unit removably supported upon the chassis within the shell; and leg means foldably mounted upon the shell adapted to support the shell upon the ground; said chassis being connectable to and releasable from the shell with or without the second unit thereon.

European Patent Application Number EP0426907

Inventor: Salvatore Belcastro

Issued: May 15, 1991

The lorry (1) has a flat bed (2) and, by means of winching and hauling means, is able to let a boat (9) into the water or take it out therefrom. Said boat (9) and the cab (3) can be put together by assembly means to form a vehicle equipped for camping. The invention applies to vehicles intended for camping and sailing.

While these trailers may be suitable for the purposes for which they were designed, they would not be as suitable for the purposes of the present invention, as hereinafter described.

SUMMARY OF THE PRESENT INVENTION

A primary object of the present invention is to provide a trailer that a sports fisherman can use to attend sporting events that serves as transport, work shop and living quarters.

Another object of the present invention is to provide a trailer having a compartment for storing a boat and its trailer and a separate compartment serving as living quarters.

Another object of the present invention is to provide a trailer wherein said boat compartment provides means for servicing the boat within an enclosed area.

Yet another object of the present invention is to provide a trailer wherein the living quarters during a sporting event.

Still yet another object of the present invention is to provide said trailer with a ramp for load and unloading the trailer and boat.

Another object of the present invention is to provide said trailer with temperature control comprising an air conditioning and heating unit.

Yet another object of the present invention is to provide said trailer with a satellite reception system.

Still yet another object of the present invention is to provide a trailer boat compartment with storage compartments for fishing tackle and rod and reels.

Another object of the present invention is to simplify the participation in a remotely scheduled event using a single motorized conveyance wherein the trailer tow vehicle is used to move the trailer to a desired location where the tow vehicle is detached and used to move the boat and boat trailer in and out of the trailer to the water.

Additional objects of the present invention will appear as the description proceeds.

The present invention overcomes the shortcomings of the prior art by providing an enclosed trailer having a pair of compartments with a common wall. One compartment serves as storage area and work space for a boat and trailer with a rear door that drops down providing a ramp for loading and unloading the boat and trailer. The other compartment comprises living quarters that is fully equipped with sleeping area and storage that can include stove, sink, and toilet, including other personal needs. A tow vehicle transports the trailer and can be unhooked from the trailer for boat towing or cruising.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
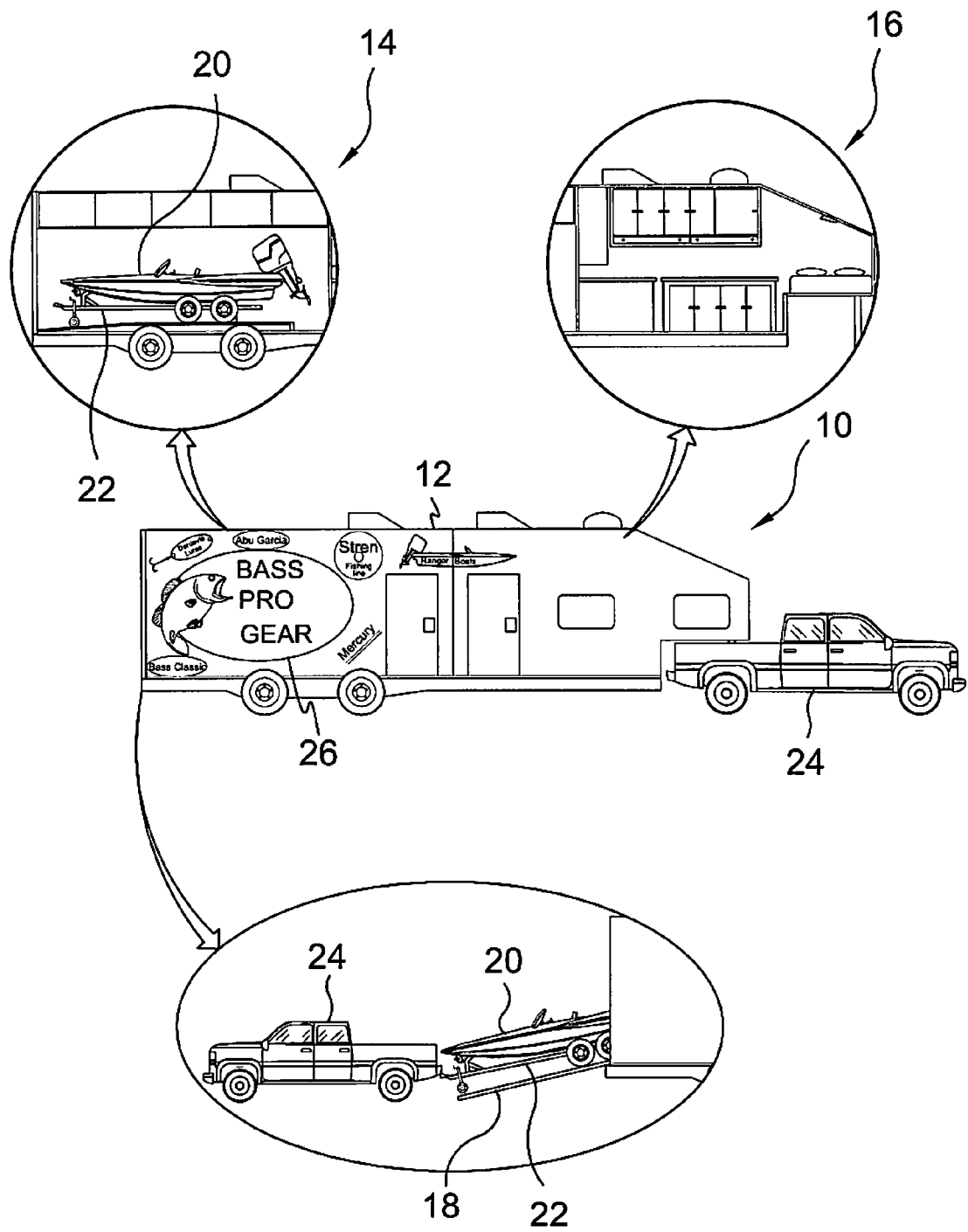
FIG. 1 is an illustrative view of the present invention.

Turning now descriptively to the drawings, in which similar reference characters denote similar elements throughout the several views, the figures illustrate the Boat Transport Trailer with Living Quarters of the present invention. With regard to the reference numerals used, the following numbering is used throughout the various drawing figures.

10 Boat Transport Trailer with Living Quarters of the present invention
12 transport trailer
14 boat compartment
16 living compartment
18 rear door/ramp
20 boat
22 boat trailer
24 towing vehicle
26 exterior surface
28 heat and air unit
30 satellite system
32 storage cabinet
34 tow hitch
36 platform of 14
38 horizontal portion of 36
40 transitional ramp of 36

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10. The present invention is a boat transport with living quarters 10 comprising a transport trailer 12 having a boat compartment 14 and a habitat compartment 16 with a rear door ramp 18 for loading and unloading the boat 20. The boat transport 10 optionally provides one or more extendable retractable canopies and an exterior surface 26 that can serve as a mobile advertising board. A tow vehicle 24 is used to tow the transport trailer 12 as well as the boat trailer 22.

Figure 2:
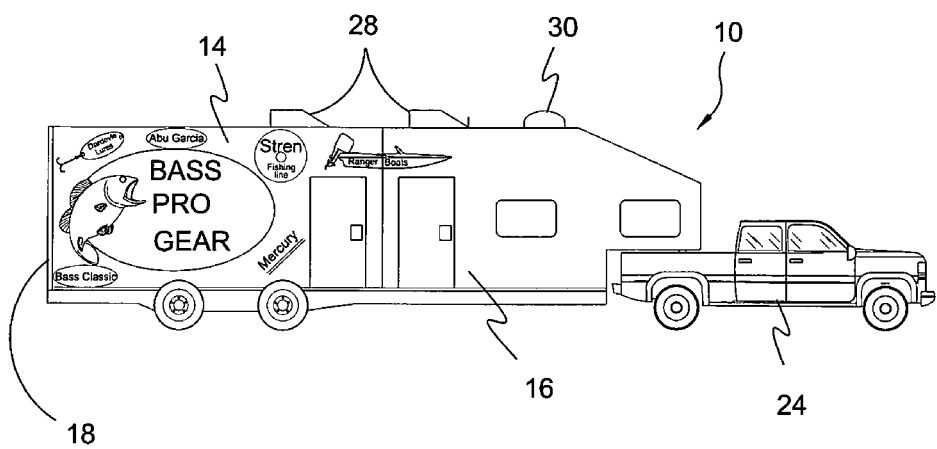
FIG. 2 is an exterior view of the present invention.

FIG. 2 is an exterior view of the present invention 10. The present invention is a multipurpose boat and living quarters transport trailer 10 providing a boat carrying quarters 14 having a fold down rear door 18 that serves as a ramp to load and unload the boat. The living quarters 16 are fully equipped with sleeping area, storage and optional stove, sink, and toilet, including other personal needs. A tow vehicle 24 transports the trailer 12 and can be unhooked from said trailer for boat towing or cruising.

Figure 3:
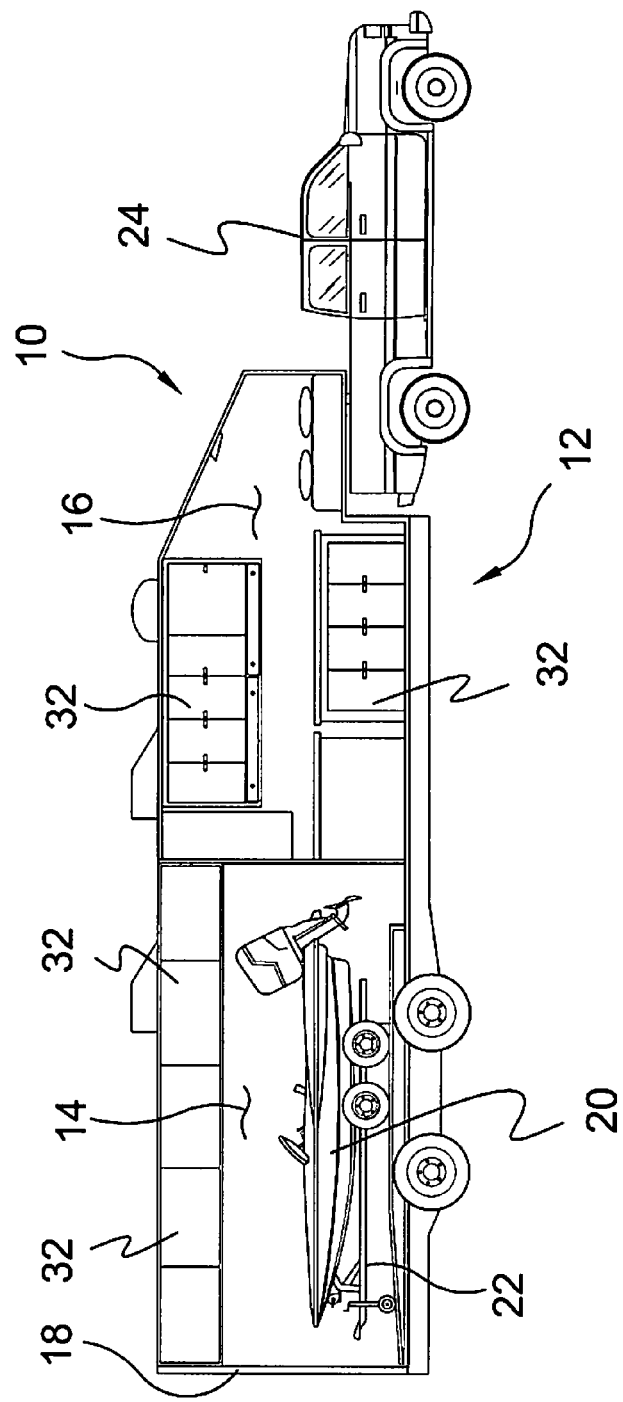
FIG. 3 is an interior view of the present invention.

FIG. 3 is an interior view of the present invention 10. Shown is the interior of the multipurpose boat and living quarter's transport trailer 12 providing a boat carrying quarters 14 having a fold down rear door 18 that serves as a ramp to load and unload the boat 20 and its trailer 20. The living quarters 16 is fully equipped with sleeping area and other essential living needs. A tow vehicle 24 transports the transport trailer 12 and can be unhooked from said trailer 12 for boat towing or cruising. Both compartments include a plurality of secureable storage cabinets 32 for food, spare parts, tools, tackle and other such items.

Figure 4:
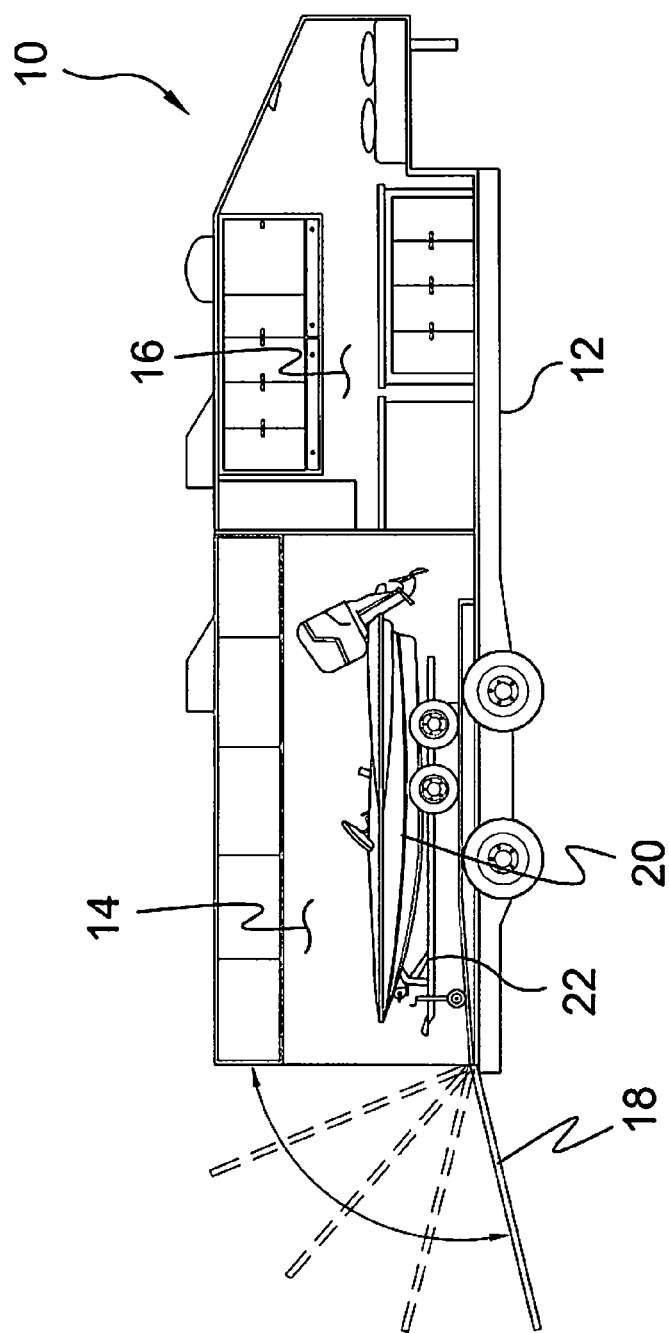
FIG. 4 is an interior view of the present invention.

FIG. 4 is an interior view of the present invention 10. The boat and living quarters transport trailer 12 makes life better for the traveling angler. The boat 20 and boat trailer 22 are stored inside the enclosed boat compartment 14 while being towed. The same tow vehicle that pulls the trailer 12 is also used to pull the angler's boat 20 and boat trailer 22 from and to the lake ramp. A full living quarters 16 serves as a place of refuge for maintenance/repair, or privacy at lake ramps or camp grounds. Shown is the door ramp 18 that is raised and lowered accordingly.

Figure 5:
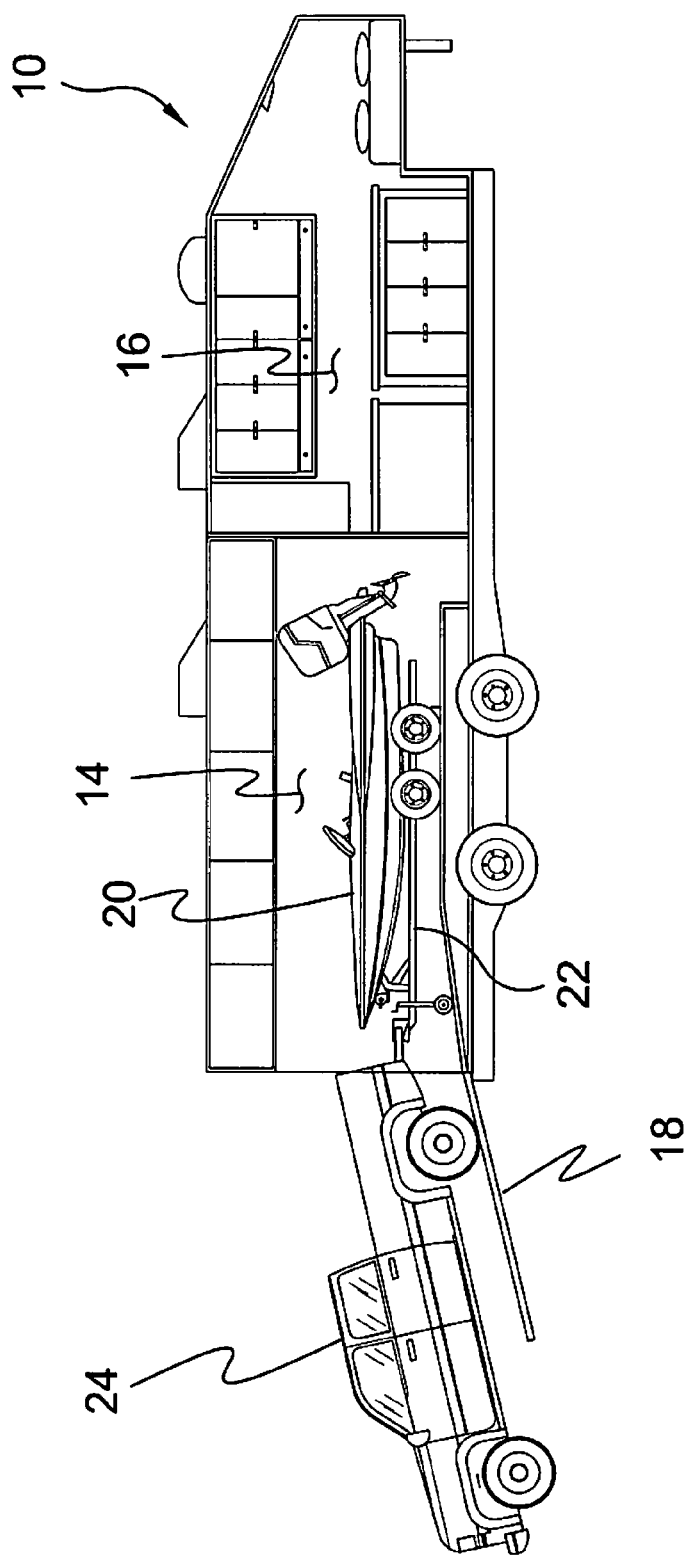
FIG. 5 is an internal view of the present invention.

FIG. 5 is an internal view of the present invention 10. The boat and living quarters transport trailer 12 makes life better for the traveling angler. The boat 20 and boat trailer 22 are stored inside the enclosed boat compartment 14 while being towed. The same tow vehicle 24 that pulls the trailer 12 is also used to pull the angler's boat 20 and boat trailer 22 from and to the lake ramp. A full living quarters 16 serves as a place of refuge for maintenance/repair, or privacy at lake ramps or camp grounds. Shown is the door ramp 18 lowered and the tow vehicle 24 hitched to the boat trailer 22.

Figure 6:
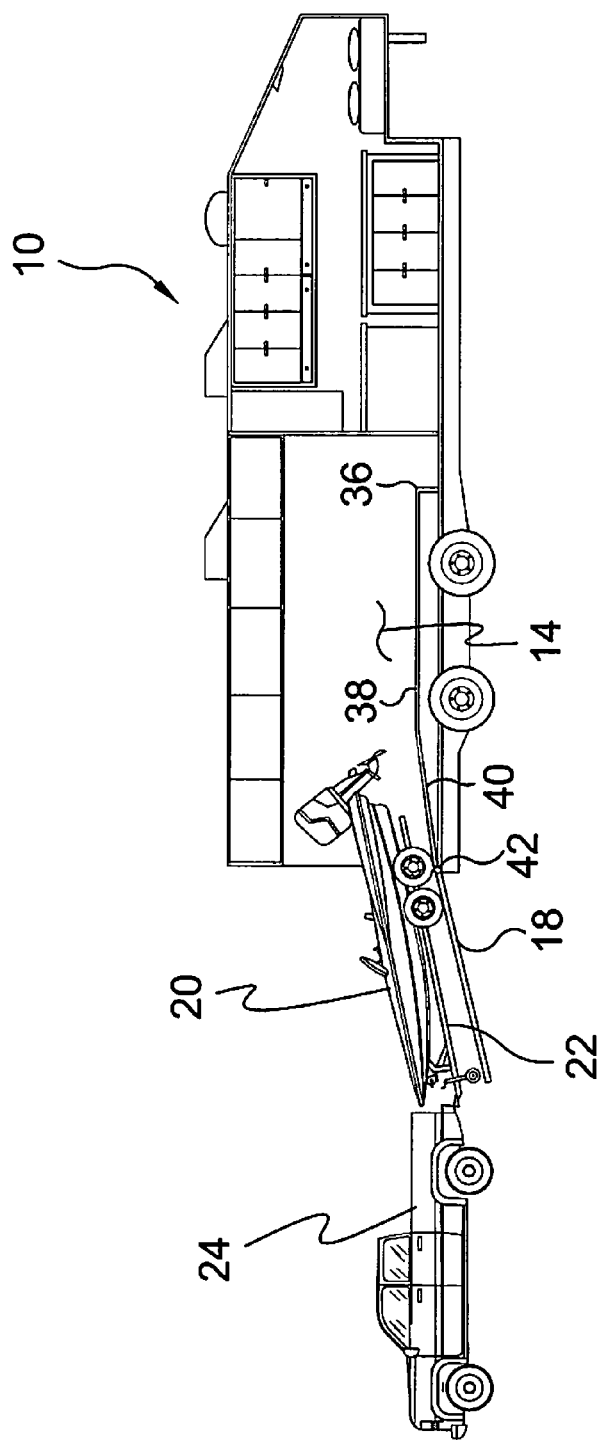
FIG. 6 is an internal view of the present invention.

FIG. 6 is an internal view of the present invention 10. Shown is the tow vehicle 24 hitched to the boat trailer 22 to remove it and the boat 20 from the boat compartment 14 in the transport trailer 12. The boat trailer 22 has an interior platform 36 on the floor of the boat storage compartment 14 that has a substantially horizontal portion 38 and a angularly disposed transition ramp 40 extending from the rear end of said horizontal portion 38 and terminates on the interior floor proximal to the hinge 42 of said door ramp 18. The transition ramp 40 compensates for the angular differentiation between said door ramp 18 and the longitudinal axis of the transport trailer 12. This allows for smoother loading and unloading of said boat 20 and boat trailer 22.

Figure 7:
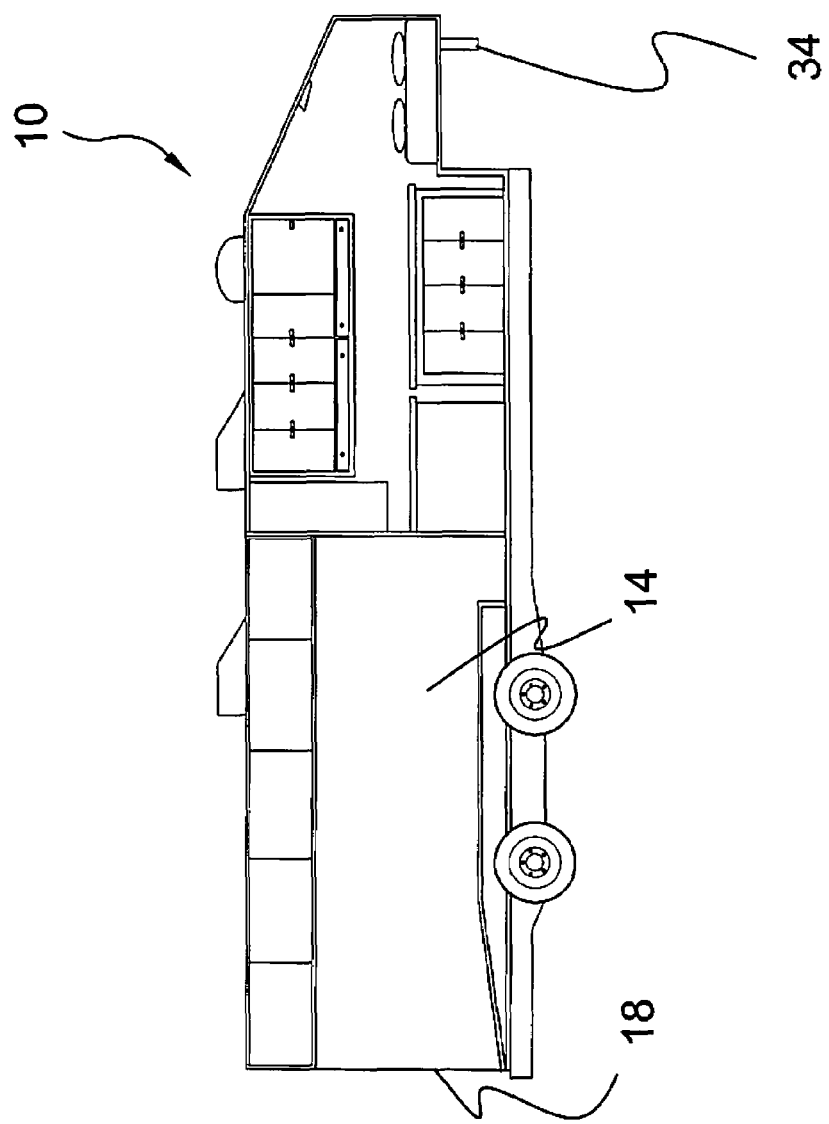
FIG. 7 is an interior view of the present invention.

FIG. 7 is an interior view of the present invention 10. Shown is the tow vehicle disengaged from the tow hitch 34 and the boat and trailer removed from the boat compartment 14. The rear door ramp 18 is closed and secured.

Figure 8:
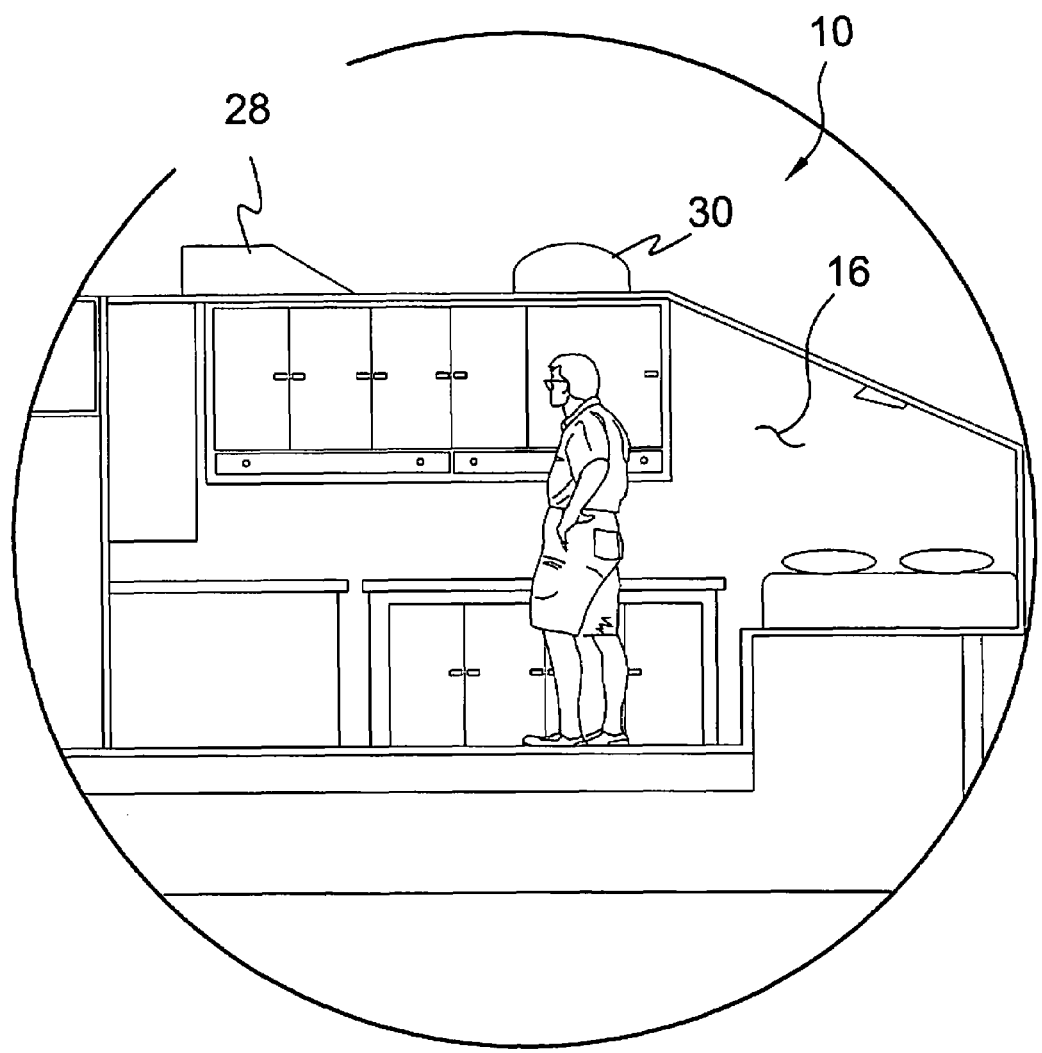
FIG. 8 is a detailed view of the living quarters of the present invention.

FIG. 8 is a detailed view of the living quarters 16 of the present invention 10. Shown are the living quarters 16 fully equipped with sleeping area, a satellite system 30, heating and air unit 28 and other essential living needs.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. An enclosed boat transport trailer to provide a mobile boat garage with living amenities comprising:
   a) a forwardly disposed living quarters to provide the transport trailer with a comfortable area to rest, eat and perform everyday living functions;
   b) a rearwardly disposed boat storage compartment sharing a common wall with said living quarters to provide the user with an independent area to secure, store and perform repair and maintenance on a boat in a private, climate controlled environment, said boat mounted on a boat trailer;
   c) a rigid ramp forming a rear wall of said transport trailer, said ramp being hinged at a bottom edge thereof at a rear edge of an interior floor of said transport trailer allowing said ramp to move from a vertical position closing off a rear opening of said trailer to a position allowing said boat trailer to be rolled out through the rear opening of said transport trailer;
   d) said transport trailer having a fixed, raised platform on said interior floor on which said boat trailer is seated when loaded into said transport trailer;
   e) said platform being substantially parallel with said interior floor in medial and forward sections thereof while a rear section of said platform is a fixed transitional ramp extending downwardly and terminating at a rear edge of the interior floor of the trailer proximal to said door hinge, whereby said transitional ramp and said rear edge of the interior floor come together at said hinged edge of said ramp, said ramp when lowered to a ground surface being aligned with said transitional ramp of said platform to provide smooth loading and unloading of said boat trailer between ground level and the medial portion of said platform; and f) said ramp being adapted for a tow vehicle to back up along said ramp, said tow vehicle having means for securing said boat transport trailer to allow said tow vehicle to pull said boat trailer with said boat aboard out of said transport trailer and to move said boat trailer into said transport trailer.

2. The enclosed boat transport trailer recited in claim 1, wherein said boat storage compartment further includes a plurality of securable storage areas including cabinets and drawers.

3. The enclosed boat transport trailer recited in claim 2, wherein said living quarters includes a sleeping area.

4. The enclosed boat transport trailer recited in claim 3, further including a heat/air conditioning unit to provide climate control to said living quarters and said boat storage compartment.

5. The enclosed boat transport trailer recited in claim 4, further including a satellite unit to provide for wireless communication.

6. The enclosed boat transport trailer recited in claim 5, wherein said transport trailer has indicia and logos disposed on the exterior surface thereof.

7. A method of storing, servicing and transporting a boat on a boat trailer comprising the steps of:
   a) placing said boat trailer carrying said boat in a rearwardly disposed boat storage compartment inside a transport trailer, said boat storage compartment sharing a common wall with living quarters in a forwardly disposed living quarters of said transport trailer, said boat storage compartment providing a user with an independent area to secure, store and perform repair and maintenance on said boat in a private, climate controlled environment, said forwardly disposed living quarters providing the user with a comfortable area to rest, eat and perform everyday living functions, a rigid ramp forming a rear wall of said transport trailer, said ramp being hinged at a bottom edge thereof allowing said ramp to move from a vertical position closing off a rear opening of said trailer to a position allowing said boat trailer to be rolled out through the rear opening of said transport trailer, said transport trailer having an interior floor in said boat storage compartment with a raised platform on which said boat trailer is seated when loaded into said transport trailer, said platform being substantially parallel with said interior floor in medial and forward sections thereof while a rear section of said platform is a fixed transitional ramp extending downwardly and terminating at a rear edge of the interior floor of the trailer proximal to said door hinge, said ramp when lowered to a ground surface being aligned with said transitional ramp of said platform to provide smooth loading and unloading of said boat trailer from ground level to said medial section of said platform, said boat being serviced and repaired while in said storage compartment;
   c) lowering said ramp;
   d) backing a tow vehicle up said ramp;
   e) securing said boat transport trailer to said tow vehicle; and
   f) using said tow vehicle to pull said boat trailer out of said transport trailer and down said ramp, a tow vehicle being used to move said boat trailer back into said trailer transport along said ramp.

\* \* \* \* \*